(12) United States Patent  
Momose

(10) Patent No.: US 8,027,069 B2  
(45) Date of Patent: Sep. 27, 2011

(54) IMAGE FORMING APPARATUS

(75) Inventor: Norihide Momose, Kizugawa (JP)

(73) Assignee: Sharp Kabushiki Kaisha, Osaka (JP)

(*) Notice: Subject to any disclaimer, the term of this patent is extended or adjusted under 35 U.S.C. 154(b) by 529 days.

(21) Appl. No.: 12/108,073

(22) Filed: Apr. 23, 2008

(65) Prior Publication Data

US 2008/0266616 A1    Oct. 30, 2008

(30) Foreign Application Priority Data

Apr. 27, 2007    (JP) .................. 2007-119057

(51) Int. Cl.
*H04N 1/04* (2006.01)
*G03G 15/00* (2006.01)

(52) U.S. Cl. ........ 358/497; 358/471; 358/474; 399/380; 399/479; 399/211

(58) Field of Classification Search .................. 358/497, 358/474, 471, 494, 401, 501, 505, 486, 400, 358/500; 399/380, 379, 211; 250/234–236; 382/312, 318, 319

See application file for complete search history.

(56) References Cited

U.S. PATENT DOCUMENTS

| 3,831,007 | A | * | 8/1974 | Braun ........................... 235/494 |
| 4,739,377 | A | * | 4/1988 | Allen ............................ 355/133 |
| 6,457,133 | B1 | * | 9/2002 | Watari et al. .................. 713/320 |
| 2006/0088336 | A1 | * | 4/2006 | Hirose et al. ................. 399/110 |
| 2006/0222435 | A1 | * | 10/2006 | Ha et al. ....................... 400/691 |
| 2009/0135443 | A1 | * | 5/2009 | Takahashi et al. ........... 358/1.14 |

FOREIGN PATENT DOCUMENTS

| JP | 07-203195 | 8/1995 |
| JP | 2005-020334 | 1/2005 |
| JP | 2005-333527 | 12/2005 |

* cited by examiner

*Primary Examiner* — Cheukfan Lee  
(74) *Attorney, Agent, or Firm* — Renner, Otto, Boisselle & Sklar, LLP

(57) ABSTRACT

An image forming apparatus is provided that, is capable of physically preventing taking-out of the set document, even when a thick copy-prohibited document is set on a document reading device. The image forming apparatus is configured to place a document on a document table, and at least the document is read by closing a pivotally supported document cover portion to cover the document and the image forming apparatus comprises a read-out document determining portion and when the document is determined to be a copy-prohibited document, and prevents the document from being taken out from the document table by locking the rotation of the pivotally supported portion of the document cover.

6 Claims, 6 Drawing Sheets

IMAGE FORMING APPARATUS

CROSS-NOTING PARAGRAPH

This Non-provisional application claims priority under 35 U.S.C. §119(a) on Patent Application No. 2007-119057 filed in JAPAN on Apr. 27, 2007, the entire contents of which are hereby incorporated herein by reference.

FIELD OF THE INVENTION

The present invention relates to an image forming apparatus, and, more particularly, to an image forming apparatus capable of physically preventing taking-out of a copy-prohibited document.

BACKGROUND OF THE INVENTION

An image forming apparatus is proposed that has a function of preventing copying (printing) of copy-prohibited documents represented by bank notes, securities, etc.

Japanese Laid-Open Patent Publication No. 2005-20334 discloses the image forming apparatus that, when setting the copy-prohibited document on a document reading device (scanner) and trying to copy the document, is capable of not only preventing copying of the document but also physically preventing taking-out of the thus set copy-prohibited document.

In the image forming apparatus disclosed in Japanese Laid-Open Patent Publication No. 2005-20334, a locking claw which is disposed at a document cover portion (document mat) of the image forming apparatus and used for fastening the document cover portion to a document setting portion of the document reading device fastens (locks) the document cover portion to the document setting portion engaging with a locking portion disposed at the document setting portion.

Therefore, in the image forming apparatus when the copy-prohibited document is a paper with the thickness of the order of several millimeters, the document set on the document reading device can be physically prevented from being taken out.

However, when the copy-prohibited document is, for example, a thick document such as a book, the locking claw can not engage with the locking portion disposed at the document setting portion.

As a result, the document cover portion can not be fastened to the document setting portion and the thick document can not be physically prevented from being taken out from the document setting portion.

SUMMARY OF THE INVENTION

An object of the present invention is to provide an image forming apparatus that, is capable of physically preventing the thick document from being taken out from the document reading device, even when a thick copy-prohibited document is set on a document reading device.

Another object of the present invention is to provide an image forming apparatus in which a document is placed on a document table, and at least the document is read by closing a pivotally supported document cover portion to cover the document and the image forming apparatus comprises a read-out document determining portion, when the document is determined to be a copy-prohibited document, and prevents the document from being taken out from the document table by locking the rotation of the pivotally supported portion of the document cover.

A further object of the present invention is to provide the image forming apparatus that has an engaging portion that turns in conjunction with opening and closing of the document cover portion and a fixed driving portion that drives an engaging piece that engages with the engaging portion, and wherein the engaging piece engages with the engaging portion by actuating the fixed driving portion.

A still further object of the present invention is to provide the image forming apparatus in which the fixed driving portion is a solenoid or a motor.

A still further object of the present invention is to provide the image forming apparatus which gives a notice that the document is copy-prohibited when the document is determined by the determining portion to be the copy-prohibited document.

A still further object of the present invention is to provide the image forming apparatus in which the locking is released by a predetermined operation such as inputting a password.

A still further object of the present invention is to provide the image forming apparatus which issues an alarm when the document is taken out from the apparatus while the document cover portion is in a rotation-locked state.

PREFERRED EMBODIMENTS OF THE INVENTION

Figure 1:
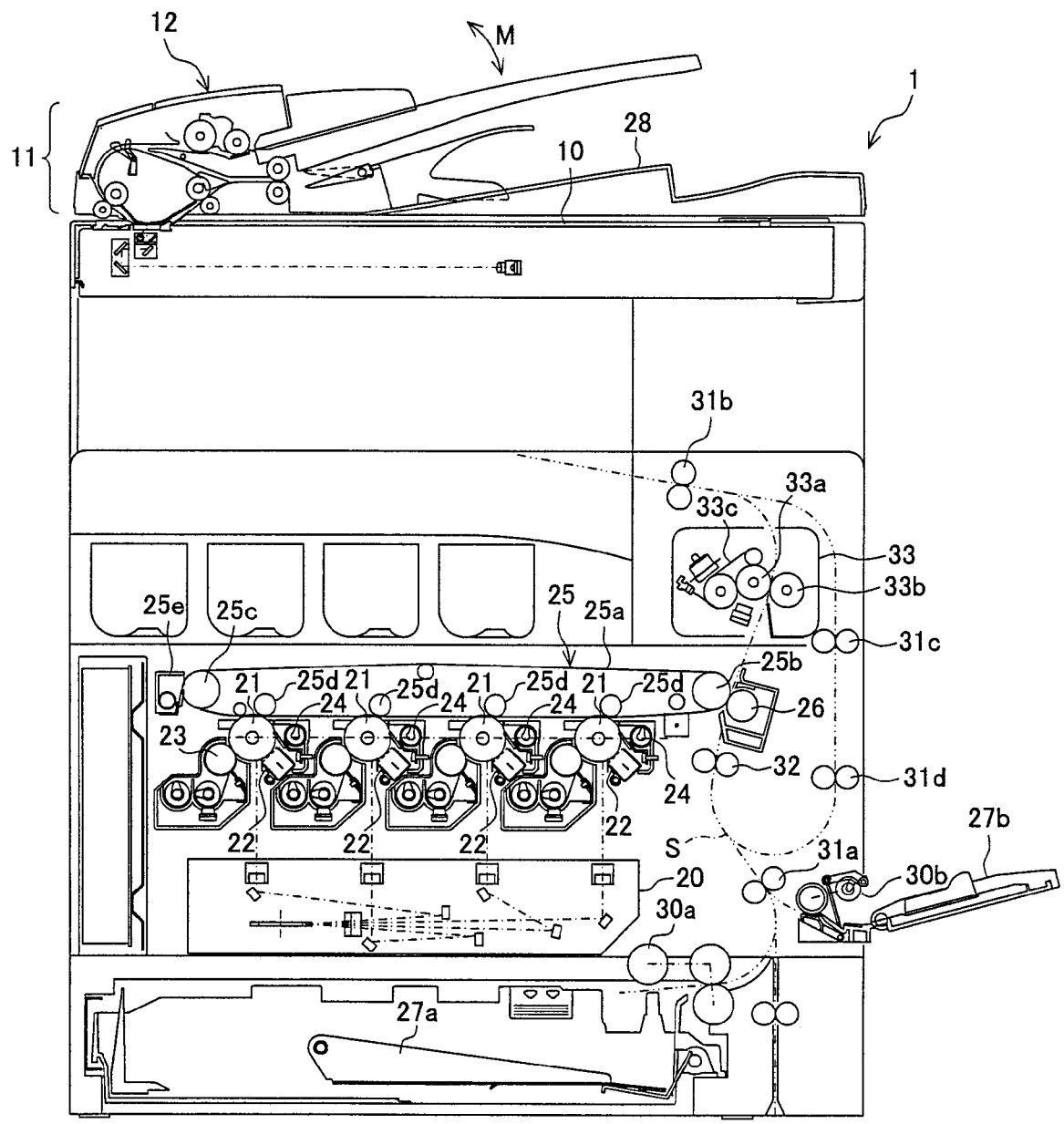
FIG. 1 is a full sectional view for description of an outline of an image forming apparatus according to the present invention.

FIG. 1 is a full sectional view for description of an outline of an image forming apparatus according to the present invention.

Reference numeral 1 denotes the image forming apparatus and the image forming apparatus 1 forms monochrome or multicolor images on predetermined recording paper.

Reference numeral 10 denotes a document table disposed at the upper part of the image forming apparatus 1. The document table 10 is composed of a light transmission member such as glass and a reading face of a document is pressed against it.

Reference numeral 11 denotes a document cover portion for covering the document table 10. The document cover portion 11 is configured rotatably in the direction of an arrow M, and the document is manually placed on the document table 10, with the document cover portion 11 opened.

The document cover portion 11 is provided with an automatic document feeder 12 for automatically feeding the document onto the document table 10.

Reference numeral 20 denotes an exposure portion disposed at the lower part of the image forming apparatus 1. The exposure portion 20 is composed of a polygon mirror (not shown) for scanning a laser beam and optical elements (not shown) such as a lens and a mirror for guiding the laser light reflected by the polygon mirror to a photosensitive drum 21.

The laser light irradiated by the exposure portion 20 forms an electrostatic latent image corresponding to document image data on the charged photosensitive drum 21.

The exposure portion 20 may also be composed of a writing head with other light emitting elements arranged in an array, for example, an EL or LED writing head.

Reference numeral 22 denotes a charger disposed in the vicinity of the photosensitive drum 21. The charger 22 is a charging means for uniformly electrifying the surface of the photosensitive drum 21 to a predetermined voltage and, in addition to a charger type as shown in FIG. 1, the charger of a contact type such as a roller type or a brush type may also be used.

Reference numeral 23 denotes a developer disposed in the vicinity of the photosensitive drum 21. The developer 23 converts the electrostatic latent image formed on the surface of each photosensitive drum 21 to a visible image using toners (not shown) of four colors (YMCK).

Reference numeral 24 denotes a cleaner unit disposed in the vicinity of the photosensitive drum 21. The cleaner unit 24 removes and collects the toner remaining on the surface of the photosensitive drum 21 after development and image transfer.

Document image data dealt with in the image forming apparatus 1 corresponds to a color image using colors of black (K), cyan (C), magenta (M), and yellow (Y). Therefore, four pieces are provided for the photosensitive drum 21, the charger 22, the developer 23, and the cleaner portion 24, respectively to form four kinds of latent image corresponding to respective colors.

Reference numeral 25 denotes an intermediate transfer belt unit disposed above the photosensitive drum 21.

The intermediate transfer belt unit 25 is composed of an intermediate transfer belt 25a, an intermediate transfer belt driving roller 25b, an intermediate transfer belt driven roller 25c, an intermediate transfer roller 25d, and an intermediate transfer belt cleaning unit 25e.

The intermediate transfer belt 25a is disposed so as to come into contact with the photosensitive drum 21 and is laid in a tensioned state around, the intermediate transfer belt driving roller 25b, the intermediate transfer belt driven roller 25c, and the intermediate transfer roller 25d and is driven to rotate by them.

With respective color toner images formed on the photosensitive drums 21 being sequentially transferred, one over the other, onto the intermediate transfer belt 25a, a color toner image (multi-color toner image) is formed.

The intermediate transfer belt 25a is endlessly formed using, for example, a film with the thickness of the order of 100 μm to 150 μm.

The intermediate transfer belt driving roller 25b is a roller for driving the intermediate transfer belt 25a.

The intermediate transfer belt driven roller 25c is a roller for supporting the intermediate transfer belt 25a from the back side to cause the intermediate transfer belt 25a to come into contact with a cleaning blade (not shown) of the intermediate transfer belt cleaning unit 25e, which is described later.

The intermediate transfer roller 25d is disposed so as to come into contact with the back side of the intermediate transfer belt 25a and is a roller using a metal (for example, stainless steel) shaft with the diameter of 8 to 10 mm as a base and having the surface thereof covered by a conductive, elastic material (such as EPDM or urethane foam). With this conductive, elastic material, it becomes possible to apply high voltage uniformly to the intermediate transfer belt 25a.

While a roller shaped electrode is used as a transfer electrode in FIG. 1, additionally, a brush, etc., as well may be used.

High-voltage transfer bias (high voltage of the polarity (+) opposite to the polarity (−) of charged toner) is applied to the intermediate transfer roller 25d and the applied transfer bias causes the toner image on the photosensitive drum 21 to be transferred to the intermediate transfer belt 25a.

Four intermediate transfer rollers 25d are provided corresponding to respective colors of YMCK.

Since the toner attached to the intermediate transfer belt 25a by coming into contact with the photosensitive drum 21 or the toner remaining on the intermediate transfer belt 25a without being transferred to the recording paper by a transfer roller 26 causes a mixture of color toners in a subsequent process, they are removed and collected by the intermediate transfer belt cleaning unit 25e. The intermediate transfer belt cleaning unit 25e is provided with the cleaning blade as a cleaning member.

As described above, electrostatic images turned visible on respective photosensitive drums 21 according to respective hues are superimposed on the intermediate transfer belt 25a.

The image information superimposed in this manner is transferred to the recording paper by the intermediate transfer belt 25a and the transfer roller 26 that is arranged at the position where the recording paper and the intermediate transfer belt 25a come to contact with each other.

At this moment, the intermediate transfer belt 25a and the transfer roller 26 are pressed with each other tightly with predetermined nip and the voltage is applied to the transfer roller 26 for transferring the toner to the recording paper (high voltage of the polarity (+) opposite to the polarity (−) of charged toner).

To obtain the above nip constantly, the transfer roller 26 is composed of a soft material such as an elastic roller (an elastic rubber roller or a foamed resin roller, etc.) when the intermediate transfer belt driving roller 25b is made of a hard material (such as metal) and conversely, the transfer roller 26 is composed of the above hard material when the intermediate transfer belt driving roller 25b is made of the soft material.

Reference numeral 27a denotes a paper feed cassette disposed below the exposure unit 20. The paper feed cassette 27a is a tray for stocking the recording paper. The recording paper may also be put in a manual paper feed cassette 27b disposed outside the image forming apparatus 1.

Reference numeral 28 denotes a discharged paper tray disposed at the upper part of the image forming apparatus 1. The discharged paper tray 28 is a tray for piling up printed sheets of recording paper face down.

As shown with symbol S (double dots-dash-line), the image forming apparatus 1 has a paper transport path which is positioned almost vertically and disposed for sending the recording paper supplied from the paper feed cassette 27a or the manual paper feed cassette 27b to the discharged paper tray 28 by way of the transfer roller 26 and a fixing unit 33.

The transfer roller 26, pick-up rollers 30a and 30b, a plurality of transport rollers 31a to 31d, a registration roller 32, the fixing unit 33, etc., are arranged in the vicinity of the paper transport path S.

The pick-up roller 30a, provided in the vicinity of the end of the paper feed cassette 27a, picks up sheets of recording paper one by one from the paper feed cassette 27a for supplying to the paper transport path S.

The transport rollers 31a to 31d are small-sized rollers for promoting and assisting transport of the recording paper and they are disposed along the paper transport path S.

The registration roller 32 has a function of firstly holding the recording paper being transported through the paper transport path S and then transporting the recording paper to the transfer roller 26 at such timing to adjust the leading edge of the toner image superimposed on the intermediate transfer belt 25a to the leading edge of the recording paper.

The fixing unit 33 is composed of a heat roller 33a and a pressure roller 33b arranged to rotate with the recording paper sandwiched in between and an external heating belt 33c for heating the heat roller 33a from the outside.

The heat roller 33a has a function of melting, mixing, and pressing a multicolor toner image transferred to the recording paper, thereby thermally fixing the toner image to the recording paper by thermally compressing the toner to the recording paper together with the pressure roller 33b. The heat required for the thermal compression is supplied by way of the external heating belt 33c.

The heating temperature is set to reach a predetermined fixing temperature by a control portion based on a signal from a temperature sensor (not shown).

Detailed description will then be made of the paper transport path S.

As described above, in the image forming apparatus 1 the paper feed cassette 27a are and the manual paper feed cassette 27b are disposed for stocking the recording paper beforehand and the pick-up rollers 30a and 30b are arranged for guiding sheets of recording paper supplied from the paper feed cassettes 27a and 27b, one by one, to the paper transport path S.

The recording paper to be transported from the paper feed cassettes 27a and 27b is transported by the transport roller 31a on the paper transport path S up to the registration roller 32 and is then transported to the transfer roller 26 at such timing to adjust the leading edge of the recording paper to the leading edge of the image information on the intermediate transfer belt 25a and the image information is written on the recording paper.

Thereafter, the unfixed toner on the recording paper is melted and fixed by the heat while passing through the fixing unit 33, and the recording paper is then discharged onto the discharged paper tray 28 by way of the transport roller 31b.

The above description of the recording paper transport processing is for the description of execution of single-sided printing. At the time of execution of double-sided printing, when the printing on one side of the recording paper is finished and the rear end of the recording paper that has passed through the fixing portion 33 is held by the last transport roller 31b, the recording paper is guided to the transport rollers 31c and 31d with the transport roller 31b rotating reversely. Then, the recording paper, after passing through the registration roller 32 and finishing of the print on the other side of the paper, is discharged to the discharged paper tray 28.

Figure 2:
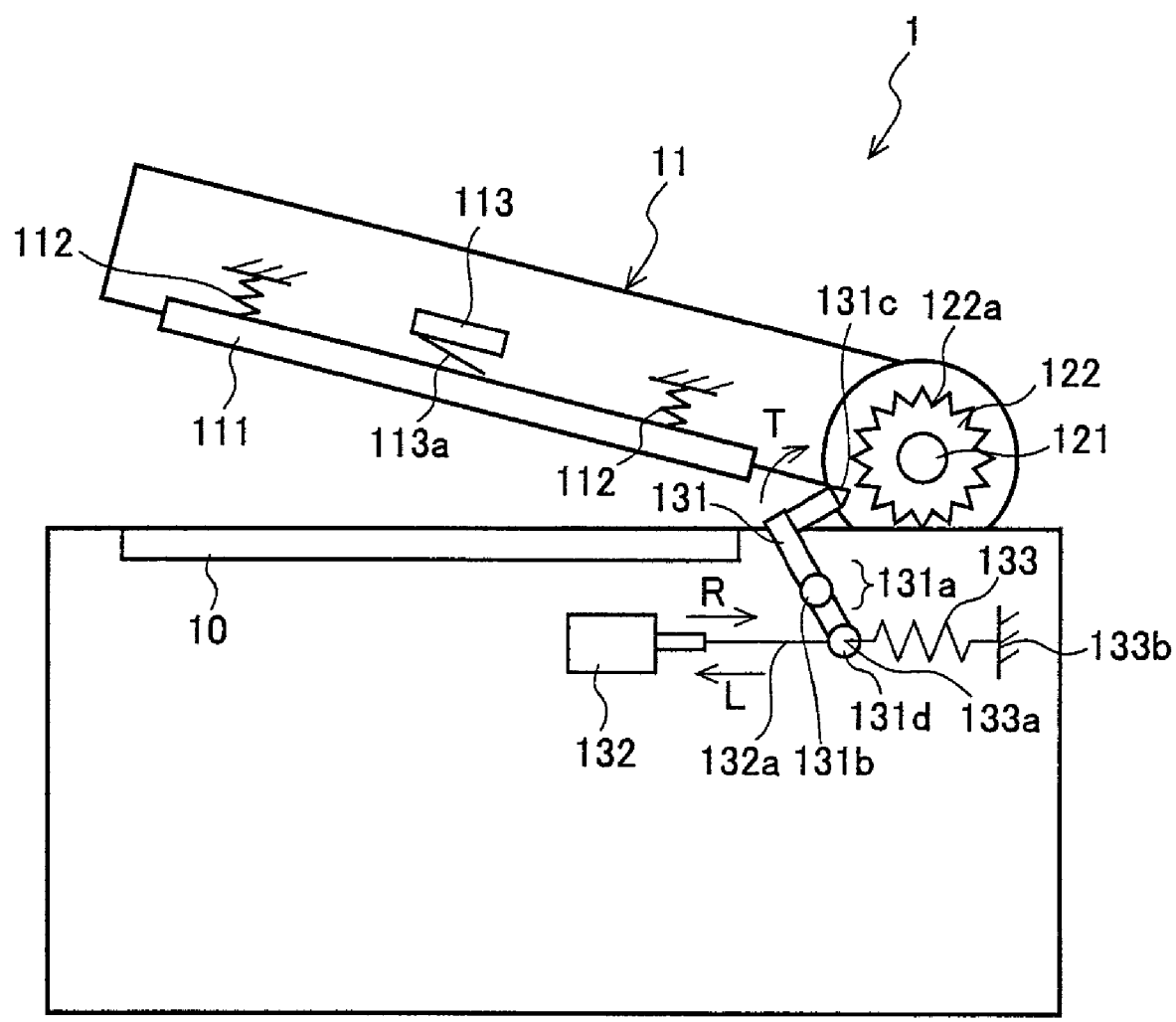
FIG. 2 is a view for description of a mechanism capable of physically preventing taking-out of a copy-prohibited document from being taken out from the document table.

Description will then be made of a mechanism capable of physically preventing a copy-prohibited document from being taken out from the document table 10, with reference to FIG. 2.

The document cover portion 11 is provided with a backboard 111 for pressing the document against the document table 10 and a pressure detecting portion 113 for detecting such pressure and is pivotally supported on the image forming apparatus 1 using a supporting shaft 121.

The backboard 111 is a member that presses the document against the document table 10 and is made of white resin.

The backboard 111 is supported movably to the document cover portion 11 using an elastic member 112 composed of a spring, a sponge, etc.

The pressure detecting portion 113 is disposed at the rear side of the backboard 111 that presses the document against the document table 10 and detects the document being pressed.

When a user presses the document on the document table 10 with the document cover portion 11 (backboard 111), the backboard 111 is pressed by the document and moves upward, and a detecting piece 113a provided in the pressure detecting portion 113 is pressed by the backboard 111.

For this reason, the pressure detecting portion 113 is capable of detecting the document being pressed by a user.

The supporting shaft 121 supports the document cover portion 11 pivotally to the image forming apparatus 1 using is supported on the image forming apparatus 1 using a bearing (not shown).

An engaging portion 122 having a large number of notches 122a formed by gear-shaped engaging teeth is coaxially fixed to the supporting shaft 121 in one body and the shaft 121 and the engaging portion 122 rotate together in response to the movement turning (opening or closing) of the document cover portion 11.

A fastening means for fastening the document cover portion 11 is composed of an engaging piece 131 formed in an L shape, the engaging portion 122 having the notches 122a capable of engaging with the engaging piece 131, and a fixed driving portion, for example, a solenoid 132, that drives the engaging piece 131 so as to engage with the notch 122a of the engaging portion.

The engaging piece 131 is pivotally supported on the image forming apparatus 1 by an engaging piece supporting shaft 131b that runs through a through hole formed at the central part 131a of the engaging piece 131.

The tip 131c of the engaging piece 131 is formed to be capable of engaging with the notch 122a of the engaging portion.

A shaft 132a of the solenoid (fixed driving portion) and an end 133a of an elastic body (such as a spring) 133 are fixed to a tip 131d of the engaging piece 131. The other end 133b of the spring 133 is fixed to the image forming apparatus 1.

When the user tries to copy the copy-prohibited document, the solenoid 132 receives the control of the control portion which is described later, and moves (activates) its shaft 132a to the left (in the direction of arrow L shown in FIG. 2) (the solenoid 132 is on).

When, by the control of the control portion (the solenoid 132 is turned on), the shaft 132a of the solenoid is moved to the left as shown in FIG. 2, the tip 131c of the engaging piece rotates to the right (in the direction of arrow T shown in FIG. 2) around the engaging piece supporting shaft 131b against the pulling elastic force of the spring 133, and engages with the notch 122a of the engaging portion 122.

As seen above, since the rotating of the supporting shaft 121 (pivotal portion of the document cover portion 11) is locked (locking of the document cover portion 11) with the tip 131c of the engaging piece 131 engaged with the notch 122a of the engaging portion 122 integrated with the pivotal shaft 121 of the document cover portion 11, opening of the document cover portion 11 is made impossible and therefore, the document on the document table 10 becomes incapable of being taken out.

As described later, with the solenoid turned off for example, by the input of a password for releasing the locked state, the tip 131d of the engaging piece fixed to the shaft 132a of the solenoid is moved to the right (in the direction of arrow R shown in FIG. 2) by the pulling elastic force of the spring 133. In accordance with such movement, the tip 131c of the engaging piece moves so as to separate itself from the notch 122a of the engaging portion and therefore, the document cover portion 11 becomes capable of being opened (release of locking of the document cover portion 11).

Figure 3A:
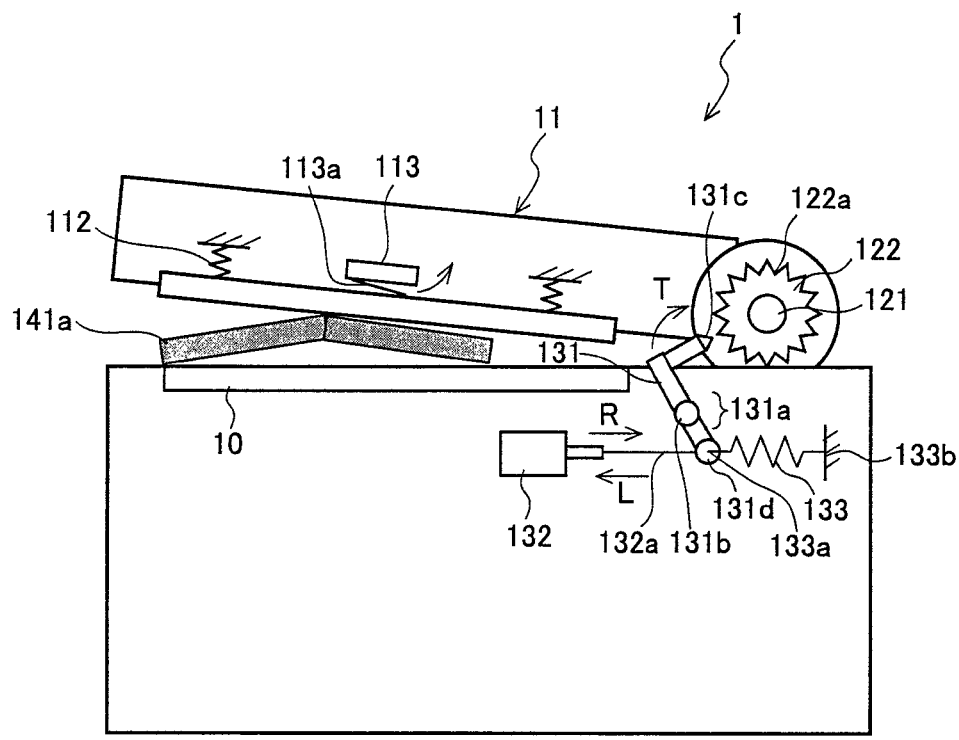
FIGS. 3A and 3B are views of how various copy-prohibited documents are placed on a document table.

FIG. 3A is a cross section of the apparatus which shows the state in which the image forming apparatus 1 detects that the document 141a is the copy-prohibited document and puts the document cover portion 11 in the rotation-locked state (locked state) to prevent the document 141a from being taken out from the document table when the user places a thick copy-prohibited document 141a such as a book on the document table 10 and tries to copy the document 141a.

As it is obvious from FIG. 3A, since the engaging portion 122 integrated with the supporting shaft 121 of the document cover portion 11 is fastened by the engaging piece 131, the opening of the document cover portion 11 is made impossible and that prevents the document 141a on the document table 10 from being taken out from the table.

Figure 3B:
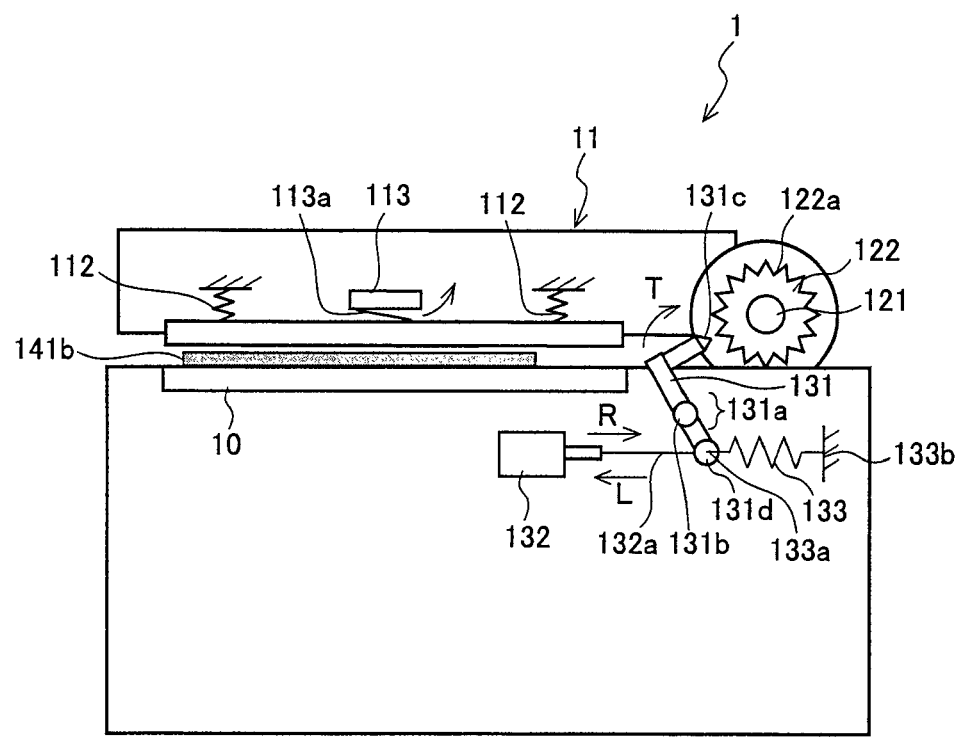

As shown in FIG. 3B, even when the user tries to copy a copy-prohibited document 141b of thin paper, likewise, the opening of the document cover portion 11 is made impossible and the document 141b on the document table 10 is prevented from being taken out from the table.

Figure 4:
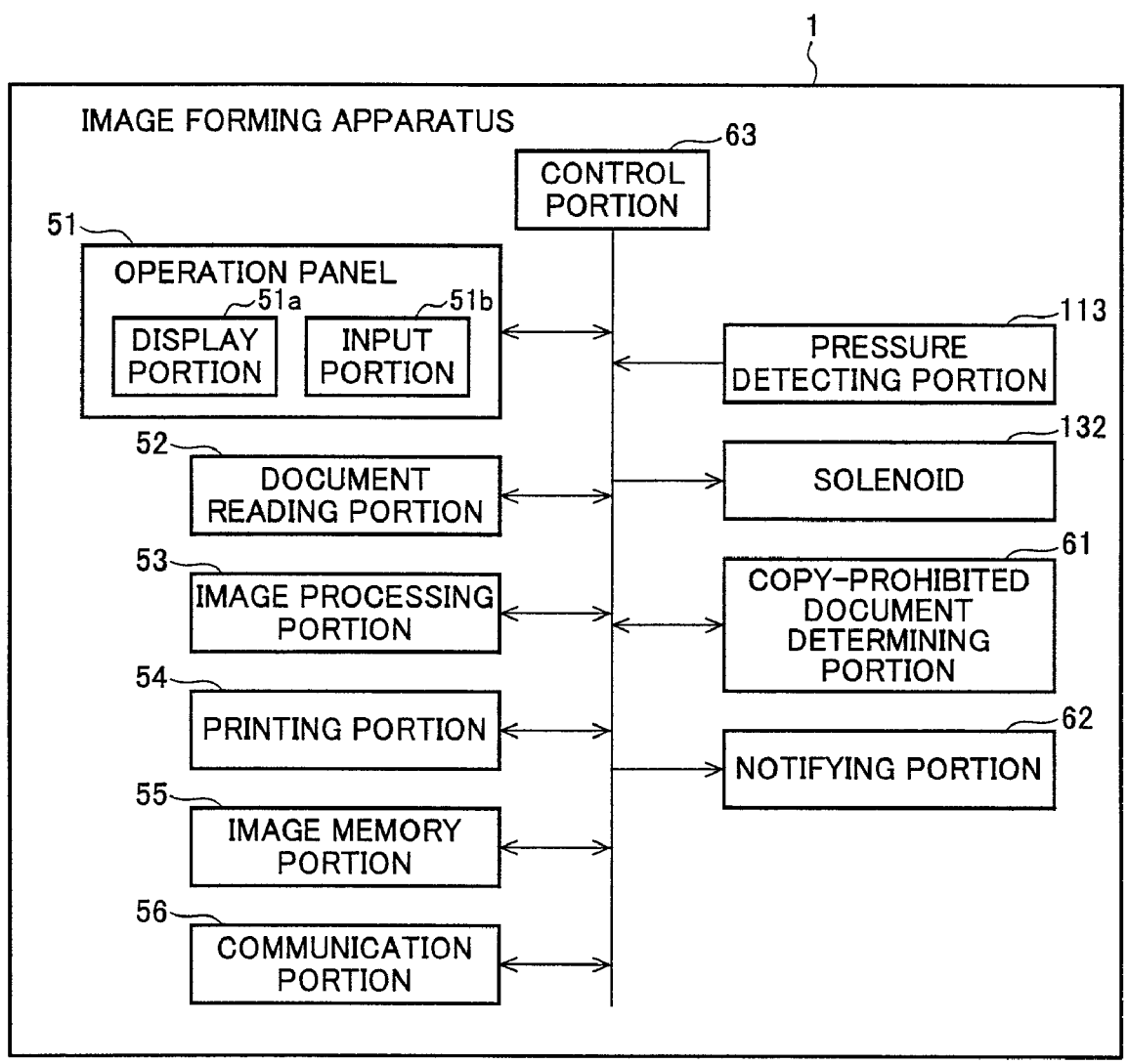
FIG. 4 is a block diagram of the image forming apparatus according to the present invention.

FIG. 4 is a block diagram of the image forming apparatus 1 in which the above described document cover portion 11 is set in the rotating-locked state (locked state).

Reference numeral 51 denotes an operation panel for operating the image forming apparatus 1. The operation panel 51 comprises a display portion 51a composed of a liquid crystal display panel, etc., and an input portion 51b composed of a ten-key board, etc.

Reference numeral 52 denotes a document reading portion that reads out the document on the document table 10 and generates document image data.

Reference numeral 53 denotes an image processing portion that applies image processing such as density conversion and color conversion to the document image data generated by the document reading portion 52 and generates print data suitable for print outputting.

Reference numeral 54 denotes a printing portion that prints the print data generated by the image processing portion 53 on the recording paper.

Reference numeral 55 denotes an image memory portion comprising a semiconductor memory, an HDD (Hard Disc Drive), etc., that stores the data such as the document image data generated by the document reading portion 52 and the print data generated by the image processing portion 53.

Reference numeral 56 denotes a communication portion that provides an interface for connecting the image forming apparatus 1 to information processing devices such as a PC and other information processing apparatuses connected by way of a LAN, etc.

As described above, the pressure detecting portion 113 detects the document on the document table 10 being pressed by the user and outputs the result of the detection to the control portion 63. When the document is not pressed, the control portion 63 instructs the user to press the document.

When the document to be copied is determined to be the copy-prohibited document by a copy-prohibited document determining portion 61, the solenoid 132, as described earlier, is controlled by the control portion 63 to move its shaft 132a shown in FIG. 2 to the left (in the direction of arrow L shown in FIG. 2) (the solenoid 132 is on) and sets the document cover portion 11 in the locked state.

The locked state is released when a correct password for releasing the locked state is input by way of the operation panel 51.

The copy-prohibited document determining portion 61 determines whether the document to be copied is the copy-prohibited document copying such as bank notes and securities which are prohibited to make copies using a technique of pattern matching, etc., and outputs the result of the determination to a notifying portion 62 and the control portion 63 if the document to be copied is the copy-prohibited document.

When the copy-prohibited document determining portion 61 determines that the document to be copied is the copy-prohibited document, the notifying portion 62 notifies a manager, etc., of the image forming apparatus 1 that the copy-prohibited document came close to being copied (first notification processing) by way of the communication portion 56.

When, in spite of the fact that the document cover portion 11 is in the rotation-locked state (locked state), the user forces the document cover portion 11 open and takes out the document to be copied by force, an alarm is issued, for example, a security company, etc., is notified of that fact (second notification processing).

It may be so arranged that an alarm (alarming device) provided in the image forming apparatus 1 is triggered as the second notification processing.

As described above, the control portion 63 turns on the solenoid 132 and sets the document cover portion 11 in the locked state when the copy-prohibited document determining portion 61 determines the document to be the copy-prohibited document.

The control portion 63, after setting the document cover portion 11 in the locked state, monitors whether the user has forced the document cover portion 11 open and taken out the document to be copied by force. The control portion 63 notifies the notifying portion 62 of that fact when detecting that the document to be copied has been taken out by force by the user.

The fact that the document to be copied has been taken out by force may be detected by various methods.

For example, when a movement sensor is disposed at the document cover portion 11, operating condition of the movement sensor is monitored, and the movement sensor is activated in spite of the fact that the document cover portion 11 is in the locked state, it may be assumed that the user has taken out the document to be copied from the document table by force.

When the document is read out at a predetermined interval and the read-out document data is blank (all white or all black), it may be assumed that the user has taken out the document to be copied from the document table by force.

When the user or the manager inputs the password for releasing the locked state by way of the operation panel 51 and the input password is correct, the control portion 63 turns off the solenoid 132 and releases the locked state of the document cover portion 11.

Figure 5:
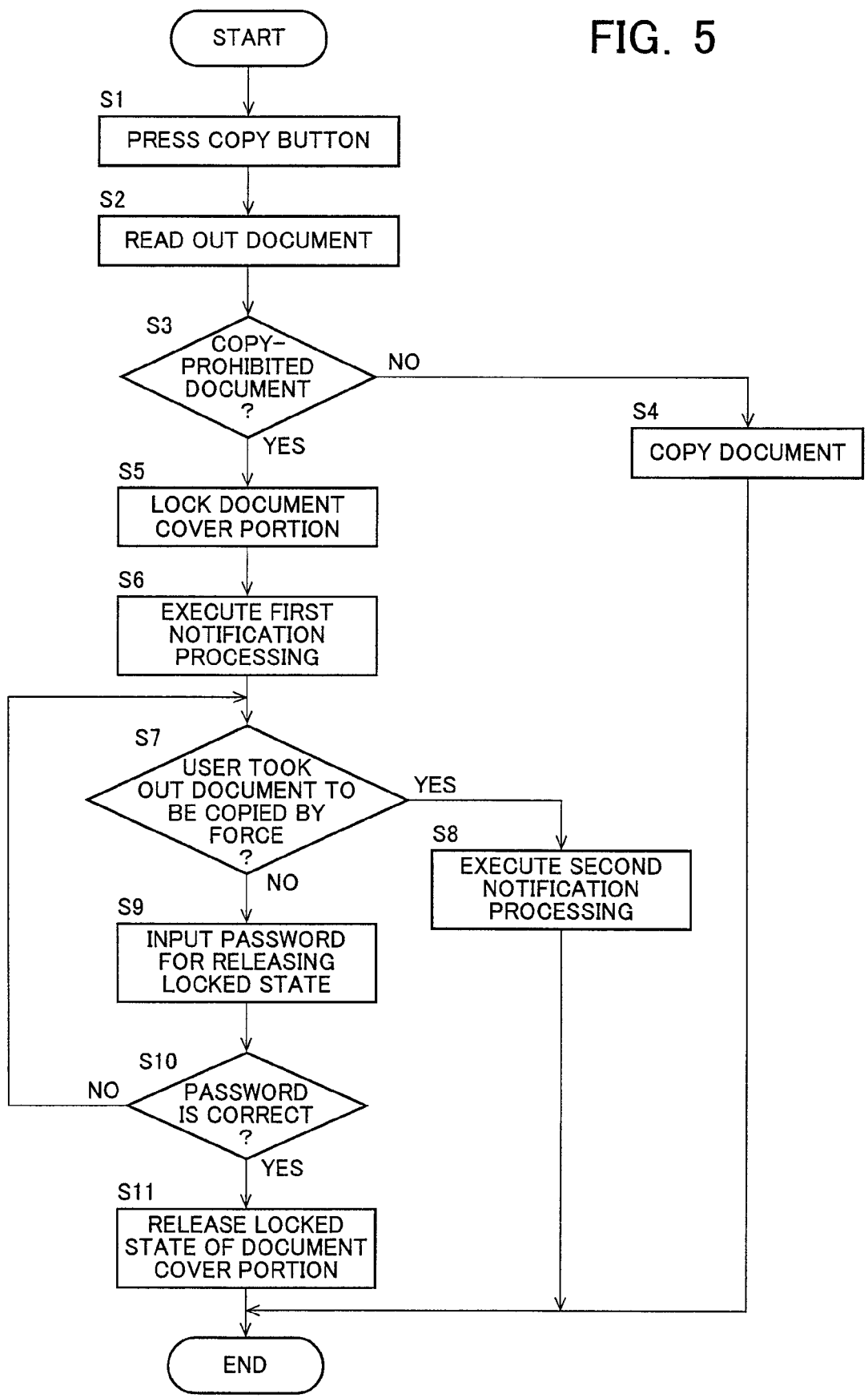
FIG. 5 is a flow chart for description of processing of putting a document cover portion in a locked state.

FIG. 5 is a flow chart for description of processing of setting the above described document cover portion 11 in the locked state.

When the user places the document on the document table 10 of the image forming apparatus 1, closes the document cover portion 11, and presses a copy button (step S1), the document reading portion 52 reads out the document and generates the document image data (step S2).

Next, the copy-prohibited document determining portion 61 determines whether the document is the copy-prohibited document (step S3).

If the document is not the copy-prohibited document (No of step S3), then the read-out document is copied (step S4).

If the document is the copy-prohibited document (Yes of step S3), then the control portion 63 turns on the solenoid 132 and sets the document cover portion 11 in the rotating-locked state (locked state) (step S5).

At the same time, the notifying portion 62 executes the first notification processing (step S6).

Then, the flow goes to the state of monitoring whether the user has forced the document cover portion 11 open and taken out the document to be copied from the table by force and determination is made of whether the user has taken out the document to be copied from the table by force (step S7).

If the user has taken out the document to be copied from the table by force (Yes of step S7), then the notifying portion 62 executes the second notification processing (step S8).

If the document to be copied has not been taken out from the table (No of step S7), then the control portion 63 displays a screen on which to input the password for releasing the locked state of the document cover portion 11 on the display portion 51a of the operation panel 51 and the user or the manager inputs the releasing password (step S9).

If the input releasing password is correct (Yes of step S10), then the control portion 63 turns off the solenoid 132 and releases the locked state of the document cover portion 11 (step S11).

If the input releasing password is not correct (No of step S10), then the processing is executed of step S7 and subsequent steps.

Figure 6:
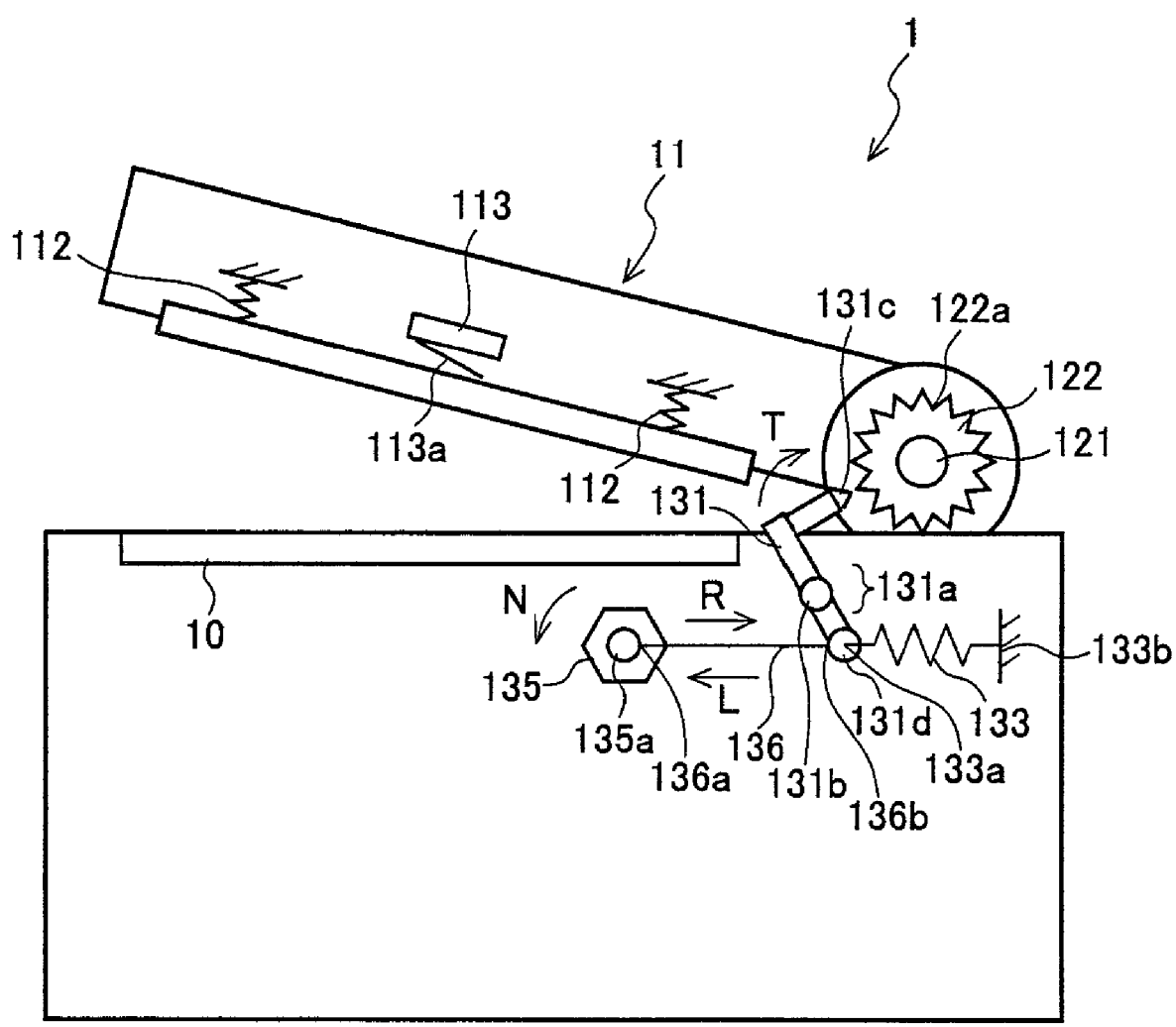
FIG. 6 is a view for description of another mechanism capable of physically preventing the copy-prohibited document from being taken out from the document table.

While, in the above image forming apparatus 1, the fixed driving portion that drives the engaging piece 131 so as to engage with the engaging portion 122 is composed of the solenoid 132, it may also be composed of other fixed driving portion, for example, a motor, as shown in FIG. 6.

To make detailed description, as shown in FIG. 6, the solenoid 132 is replaced with the motor 135 and a wire winding-up portion 135a is disposed on a driving shaft of the motor 135. A tip 136a of a wire 136 is fixed to the wire winding-up portion 135a and the other tip 136b of the wire 136 is fixed to the tip 131d of the engaging piece 131.

As described above, when detecting the copy-prohibited document, the control portion 63 turns on the motor 135, drives the driving shaft of the motor in the direction of arrow N, rotates the wire winding-up portion 135a in the same direction, and winds up the wire 136 until the engaging piece 131 engages with the engaging portion 122 (the tip 131d of the engaging piece 131 moves in the direction of arrow L). As a result, the tip 131c of the engaging piece 131 engages with the engaging portion 122 and the document cover portion 11 is locked.

When the locked state releasing password is input, the control portion 63, by driving the wire winding-up portion 135a on the motor driving shaft in a direction opposite to that of arrow N, moves the tip 131d of the engaging piece in the direction of arrow R by the pulling elastic force of the spring 133 until the tip 131c of the engaging piece 131 disengages itself from the engaging portion 122 and releases the locking of the document cover portion 11.

The present invention enables, even if a thick copy-prohibited document is set on a document reading device, physically preventing the document from being taken out from the document reading device.

The invention claimed is:

1. An image forming apparatus in which a document is placed on a document table, and at least the document is read by closing a pivotally supported document cover portion to cover the document,
the image forming apparatus comprising a copy-prohibited document determining portion which determines whether the document is a copy-prohibited document, wherein when the document is determined to be a copy-prohibited document, the image forming apparatus prevents the document from being taken out from the document table by locking the rotation of the pivotally supported portion of the document cover, and
comprising an engaging portion that turns in conjunction with opening and closing of the document cover portion and a fixed driving portion that drives an engaging piece that engages with the engaging portion, wherein
the engaging piece engages with the engaging portion by actuating the fixed driving portion.

2. The image forming apparatus as defined in claim 1, wherein the fixed driving portion is a solenoid or a motor.

3. The image forming apparatus as defined in claim 1, which gives a notice that the document is copy-prohibited when the document is determined by the determining portion to be the copy-prohibited document.

4. The image forming apparatus as defined in claim 1, wherein
the locking is released by a predetermined operation.

5. The image forming apparatus as defined in claim 4, wherein the predetermined operation is an inputting of a password.

6. The image forming apparatus as defined in claim 1, wherein the apparatus issues an alarm when the document is taken out from the apparatus while the document cover portion is in a rotation-locked state.

* * * * *